(12) United States Patent
Franklin et al.

(10) Patent No.: US 9,304,338 B2
(45) Date of Patent: Apr. 5, 2016

(54) METHODS FOR ASSEMBLING DISPLAY STRUCTURES

(71) Applicant: Apple Inc., Cupertino, CA (US)

(72) Inventors: Jeremy C. Franklin, San Francisco, CA (US); Benjamin M. Rappoport, Los Gatos, CA (US); Jiang Ai, Cupertino, CA (US); Amy Qian, San Jose, CA (US); Bruce E. Berg, Santa Clara, CA (US); Eva J. Dixon, San Jose, CA (US); Ateet Piplani, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 407 days.

(21) Appl. No.: 13/791,707

(22) Filed: Mar. 8, 2013

(65) Prior Publication Data

US 2014/0118531 A1     May 1, 2014

Related U.S. Application Data

(60) Provisional application No. 61/721,426, filed on Nov. 1, 2012.

(51) Int. Cl.
*G02F 1/00* (2006.01)
*G02F 1/13* (2006.01)
*G02F 1/1333* (2006.01)

(52) U.S. Cl.
CPC .. *G02F 1/1303* (2013.01); *G02F 2001/133322* (2013.01); *G02F 2001/133354* (2013.01); *Y10T 29/49117* (2015.01)

(58) Field of Classification Search
CPC ..................................................... G02F 1/1303
USPC ............................................................ 348/95
See application file for complete search history.

(56) References Cited

U.S. PATENT DOCUMENTS

| | | | |
|---|---|---|---|
| 7,950,132 B2 | 5/2011 | Kim et al. | |
| 8,017,424 B2 | 9/2011 | Crespin et al. | |
| 8,023,112 B2 | 9/2011 | Harada et al. | |
| 2009/0103316 A1* | 4/2009 | Aoki | 362/362 |
| 2012/0140143 A1* | 6/2012 | Wurzel | 349/62 |
| 2014/0092583 A1* | 4/2014 | Franklin et al. | 362/97.1 |

FOREIGN PATENT DOCUMENTS

CN            101135802        3/2008

* cited by examiner

*Primary Examiner* — Sath V Perungavoor
*Assistant Examiner* — Jeffery Williams
(74) *Attorney, Agent, or Firm* — Treyz Law Group, P.C.; Kendall P. Woodruff; Zachary D. Hadd

(57) ABSTRACT

Electronic devices may include displays. A display may include a display unit that includes an array of display pixels and a backlight unit that provides backlight illumination for the display pixels. An automated alignment system may be used to align the display unit to the backlight unit. The alignment system may include a camera, a control unit, and computer-controlled positioners. The control unit may gather alignment feature location information from the display unit and the backlight unit using the camera. The control unit may determine a centroid of the backlight unit based on the alignment feature location information. The alignment feature location information may include the respective locations of openings in the backlight unit. The control unit may operate computer-controlled positioners to align the display unit with respect to the backlight unit using the centroid and to subsequently attach the display unit to the backlight unit.

23 Claims, 13 Drawing Sheets

METHODS FOR ASSEMBLING DISPLAY STRUCTURES

This application claims priority to U.S. provisional patent application No. 61/721,426 filed Nov. 1, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size, weight, electrical grounding, robustness, ease of assembly, and light-tightness are often important considerations in designing electronic devices. If care is not taken, displays may be bulky, may exhibit undesired light reflections, or may be prone to damage during a drop event. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may include a display unit having an array of display pixels and a backlight unit for providing backlight illumination to the display pixels.

The backlight unit may include a chassis having a rectangular opening in which backlight structures are mounted. Adhesive on the upper surface of the chassis may be used in attaching the display unit to the backlight unit.

An automated alignment system may be used to align and attach the display unit to the backlight unit. The alignment system may include a camera, a control unit, and computer-controlled positioners. The control unit may operate the camera to gather alignment feature location information from the display unit and the backlight unit. The alignment feature location information may include the location of one or more fiducials on the display unit, the location of an active area in the display unit, and/or the location of one or more openings in the backlight unit.

The alignment feature location information may be used to determine alignment parameters such as one or more display unit datums and one or more backlight unit datums.

The backlight unit datums may include a centroid of the backlight. The centroid may be determined from the respective locations of a set of openings in the backlight unit. For example, the chassis may include an opening at each of its four corners. The locations of these openings relative to each other may be determined based on images captured from the camera in the alignment system.

The control unit may operate the computer-controlled positioners to align the display unit to the backlight unit using the centroid and/or using other alignment parameters. Once aligned the computer-controlled positioners may attach the display unit to the backlight unit.

Further features, their nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
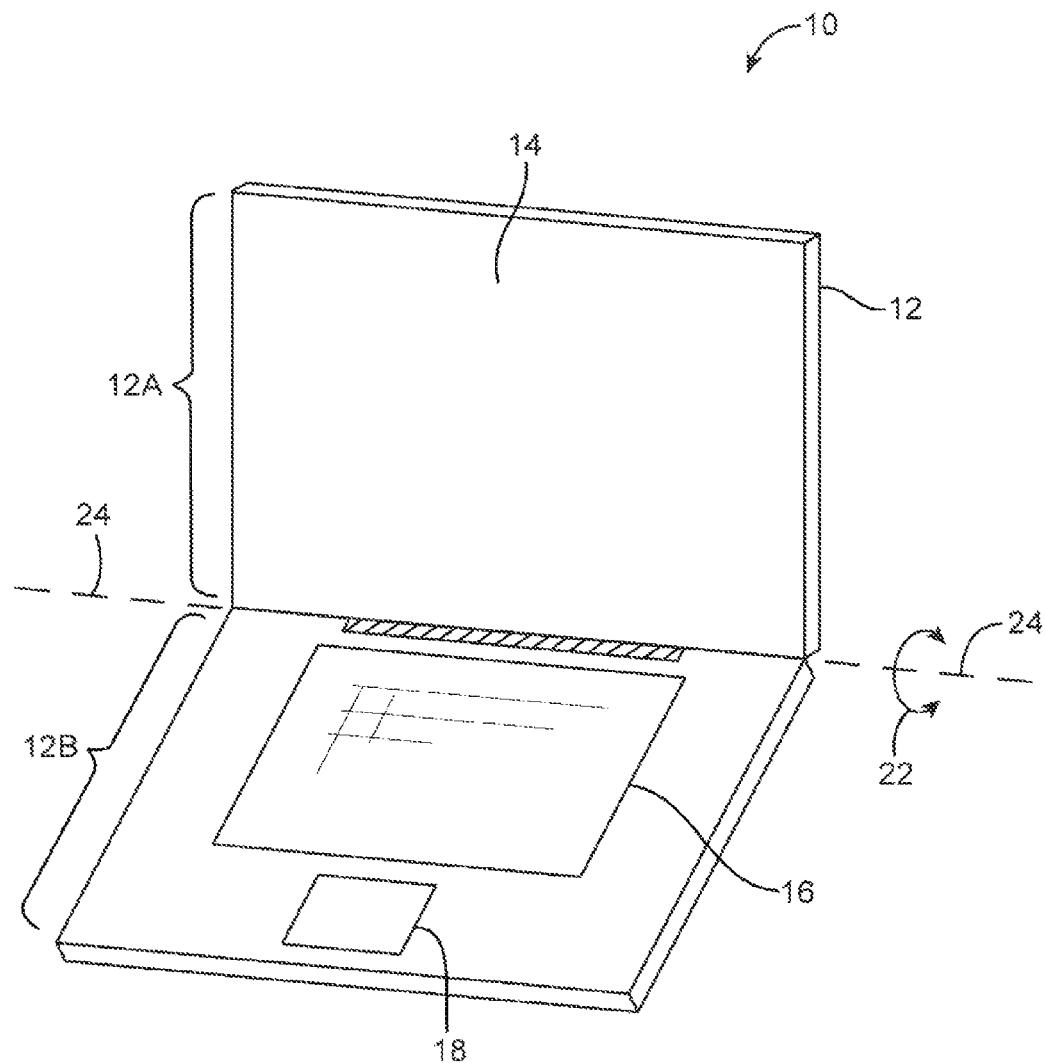
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
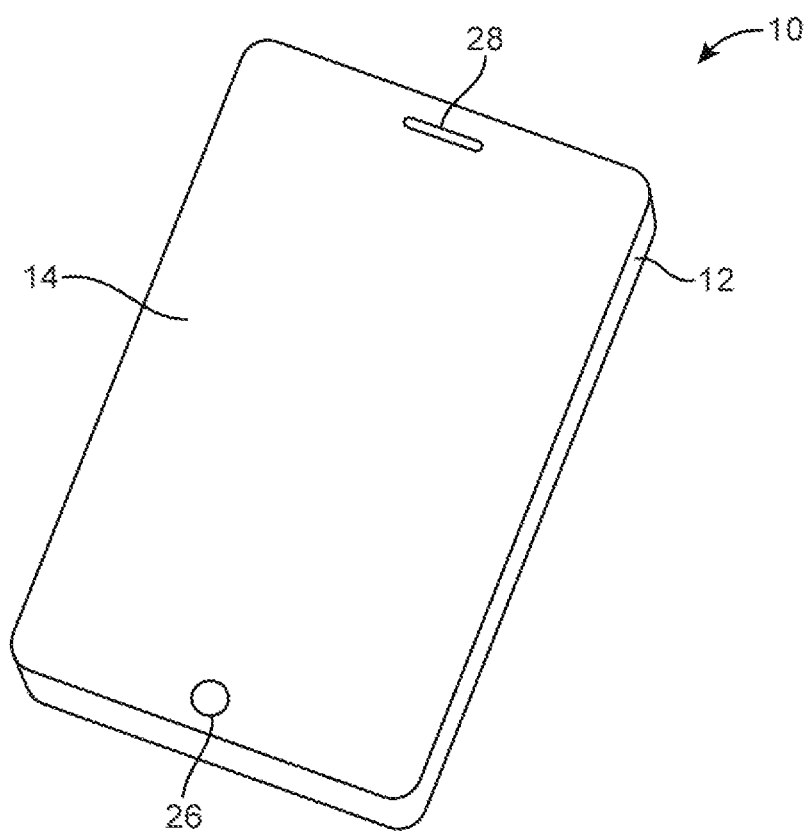
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
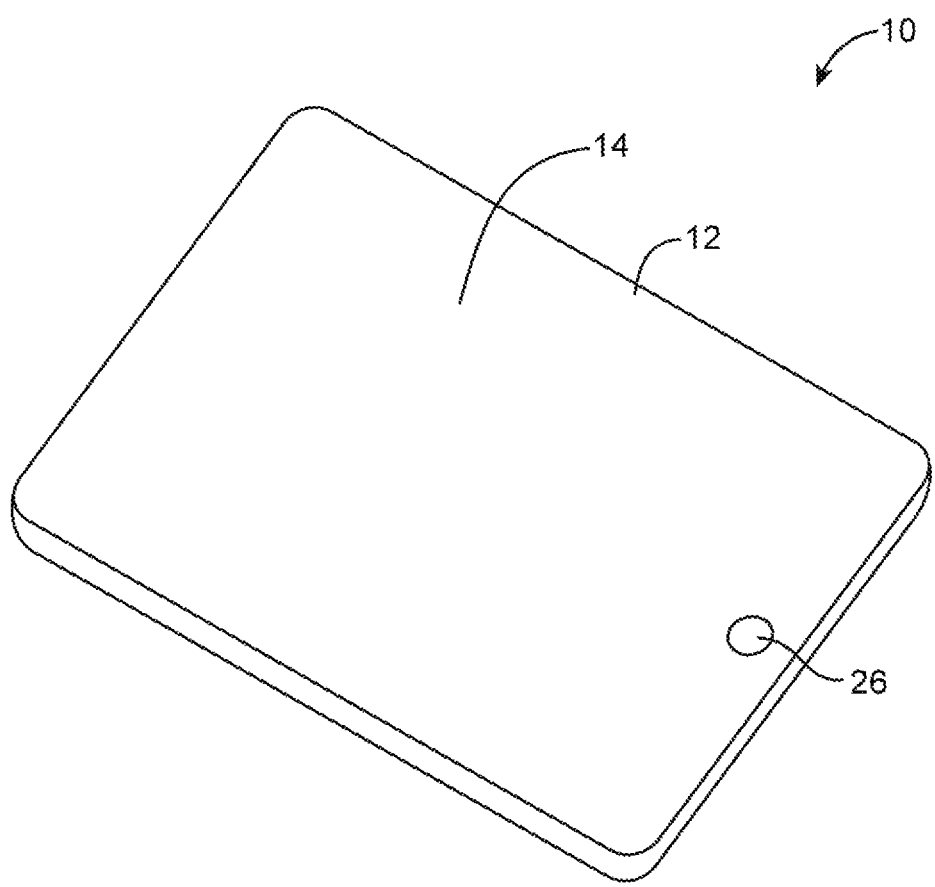
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
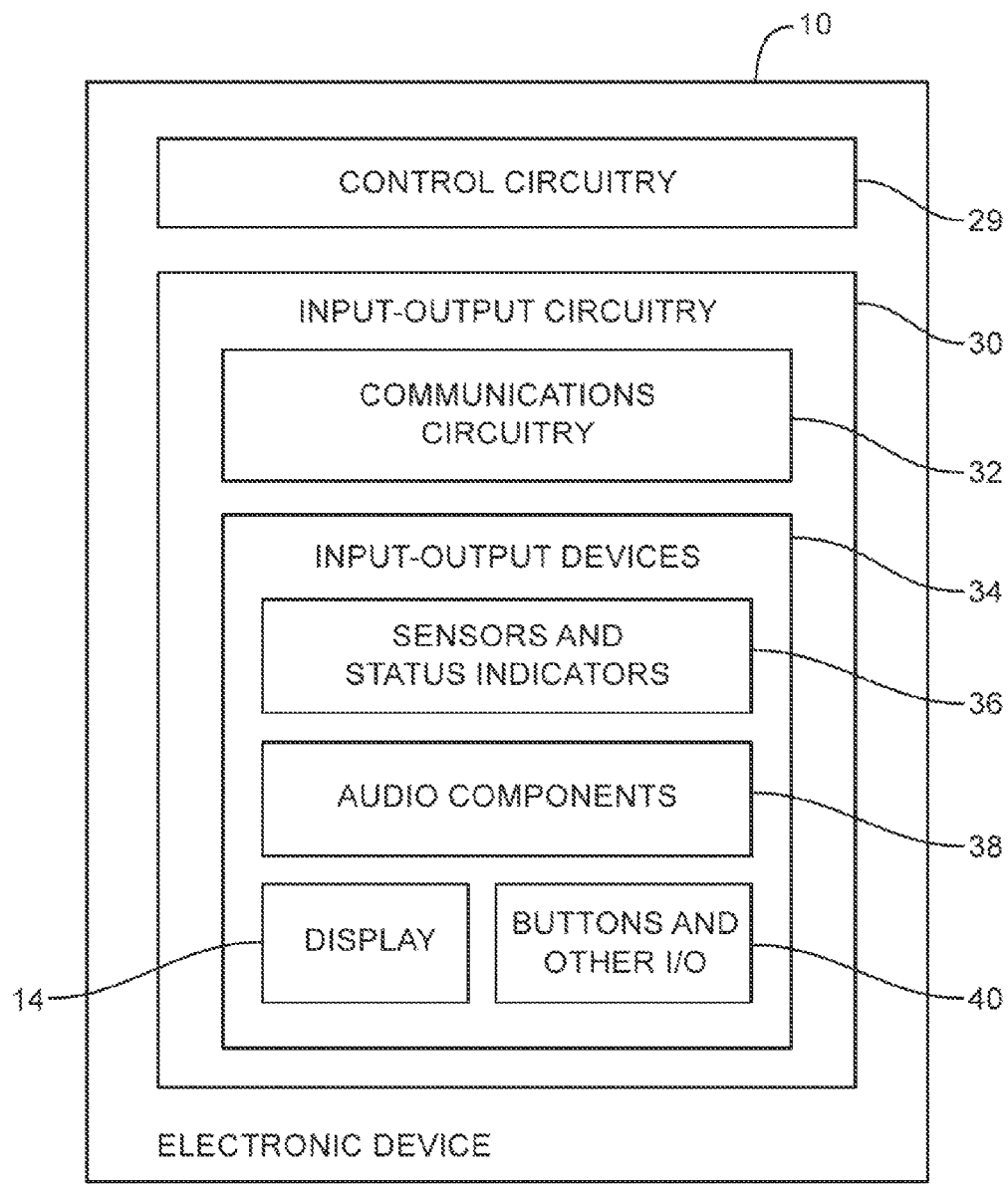
FIG. 4 is a schematic diagram of an illustrative electronic device with a display in accordance with an embodiment.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
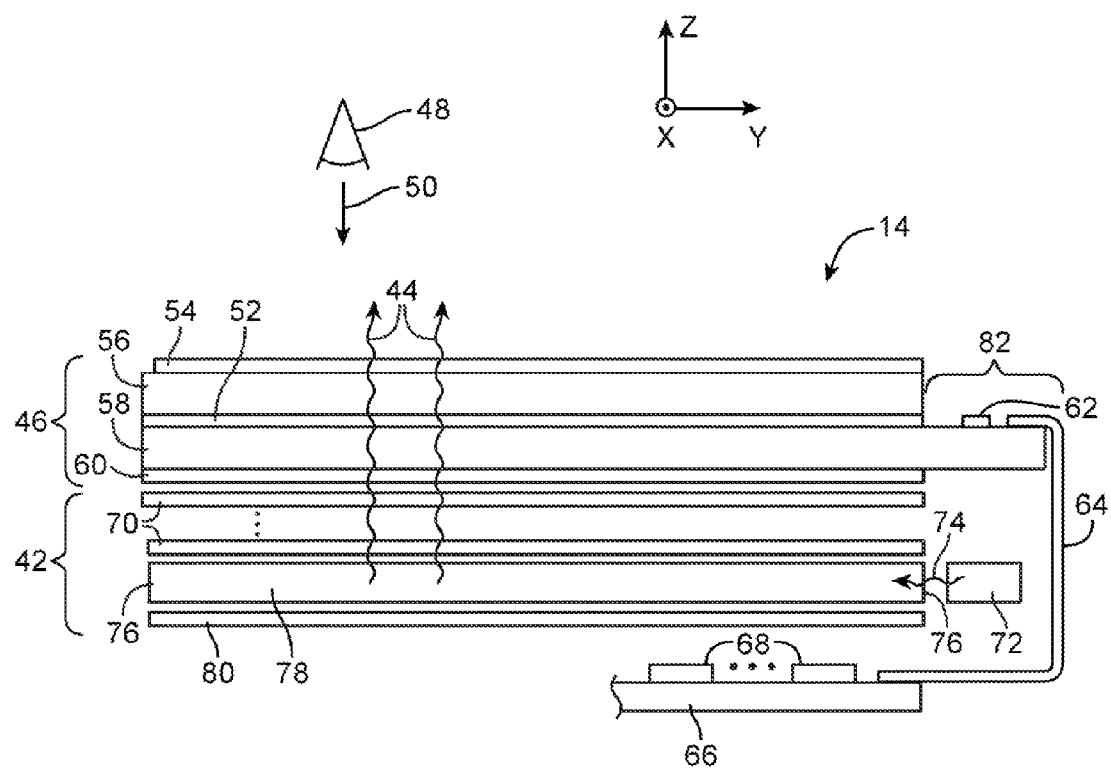
FIG. 5 is a cross-sectional side view of illustrative display layers and backlight structures in accordance with an embodiment.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted to chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates. Display layers 46 may sometimes collectively be referred to herein as a "display cell" or a "display unit."

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film transistor layer driver ledge 82 or elsewhere in device 10. A flexible printed circuit cable such as flexible printed circuit 64 may be used in routing signals between printed circuit 66 and thin-film transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
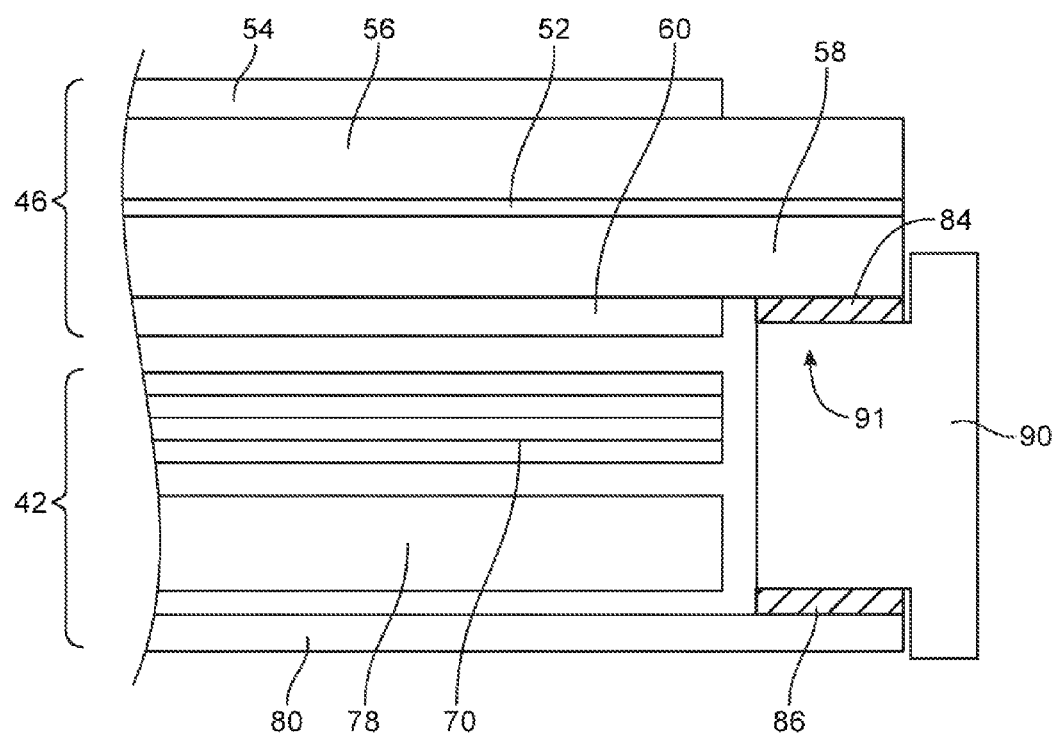
FIG. 6 is a cross-sectional side view of illustrative display layers and backlight structures showing how display layers may be attached to a chassis with adhesive in accordance with an embodiment.

Display structures such as light guide plate 78 may be mounted in a support structure such as display chassis 90 of FIG. 6. Display chassis 90 may include plastic chassis structures and metal chassis structures. Display chassis 90 may serve as an interface between the structures of display 14 and surrounding portions of housing 12. Display chassis 90 may, for example, have a rectangular shape that surrounds the peripheral edges of light guide plate 78.

Display structures such as display layers 46 may be mounted on a planar portion such as portion 91 of chassis 90. An adhesive such as adhesive 84 may be used in attaching an interior layer of display layers 46 such as display layer 58 to planar surface 91 of chassis 90. Adhesive 84 may be liquid adhesive, light-cured adhesive, pressure-sensitive adhesive (PSA), or other suitable adhesive. If desired, adhesive 84 may be opaque adhesive such as black PSA or may be optically clear adhesive.

If desired, adhesive 84 may attach polarizer 60 to chassis 90. The example of FIG. 6 in which adhesive 84 is interposed between display layer 58 and chassis 90 is merely illustrative.

Figure 7:
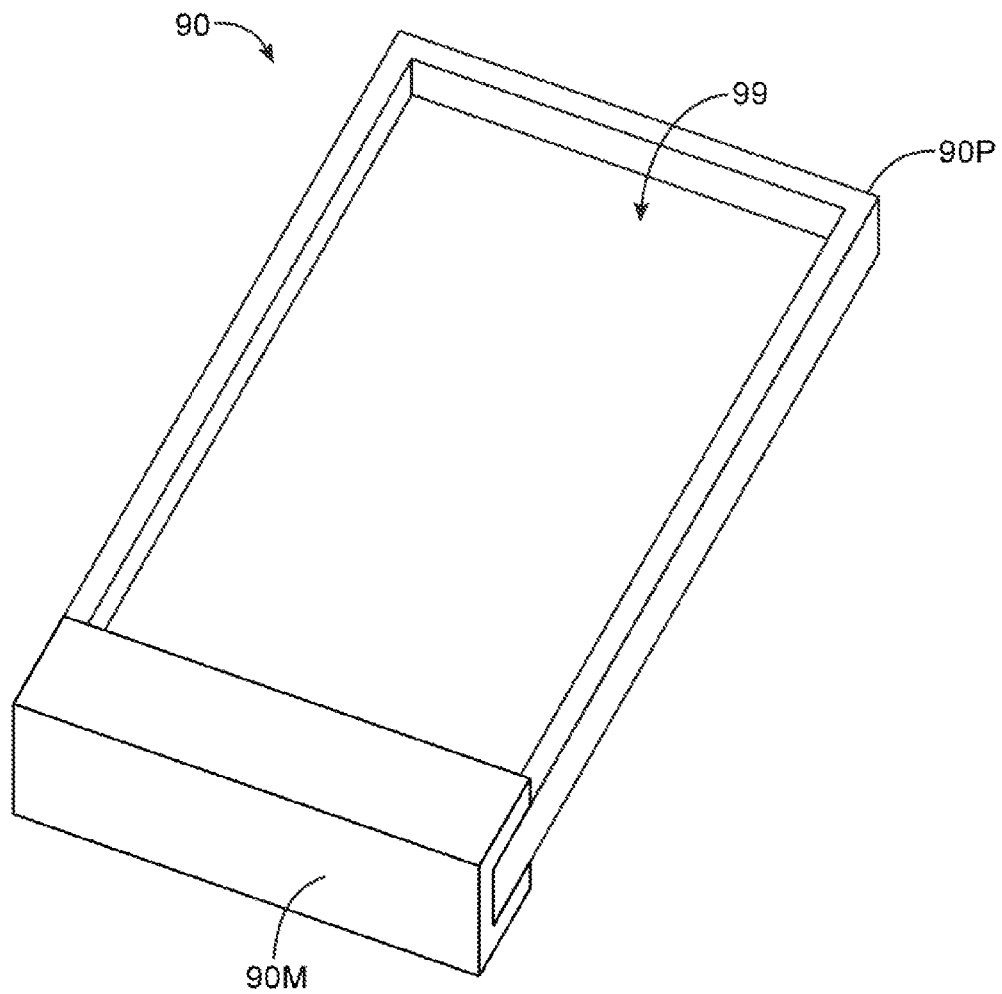
FIG. 7 is a perspective view of a chassis that includes metal chassis structures and plastic chassis structures in accordance with an embodiment.

A perspective view of an illustrative display chassis such as chassis 90 is shown in FIG. 7. As shown in FIG. 7, chassis 90 may have a rectangular opening such as rectangular opening 99. Rectangular display structures may be mounted within rectangular opening 99. Examples of rectangular display structures that may be mounted within or above opening 99 include backlight structures 42 (e.g., a rectangular light guide plate, a rectangular reflector, and rectangular optical films such as diffuser layers and brightness enhancing films). If desired, additional display structures may be mounted within chassis 90 or attached to chassis 90 such as rectangular polarizers, a rectangular thin-film transistor layer, and a rectangular color filter layer.

Display chassis 90 may include plastic structures such as plastic structures 90P (sometimes referred to as a plastic chassis or p-chassis) and metal structures such as metal structures 90M (sometimes referred to as an m-chassis or metal chassis. Display chassis 90 may have a rectangular shape with four edges. Plastic structures 90P may form three of the four edges while metal chassis 90M forms one of the four edges (as an example). Light source 72 (e.g., an array of light-emitting diodes) may be mounted within metal structures 90M (e.g., along the metal edge of chassis 90M). If desired, chassis 90 may have different configurations (e.g., a configuration in which light-emitting diodes 72 are formed within metal chassis structures 90M along two opposing edges of a rectangular chassis while plastic chassis structures 90P form the remaining two edges of the rectangular chassis).

An example of a plastic material that may be used in forming plastic structures 90P is glass-filled nylon (e.g., nylon with impregnated glass fibers). Other types of materials such as other polymers, materials with other strengthening fibers, or combinations of two or more of these materials may be used in forming plastic structures 90P, if desired.

Examples of metal materials that may be used in forming metal structures 90M are aluminum, stainless steel, copper, and copper alloys (as examples). Metal generally has a significantly higher thermal conductivity than plastic, so forming structures 52 from metal may be helpful in conducting heat away from light source 72 during operation of light source 72 to provide backlight for display 14.

Figure 8:
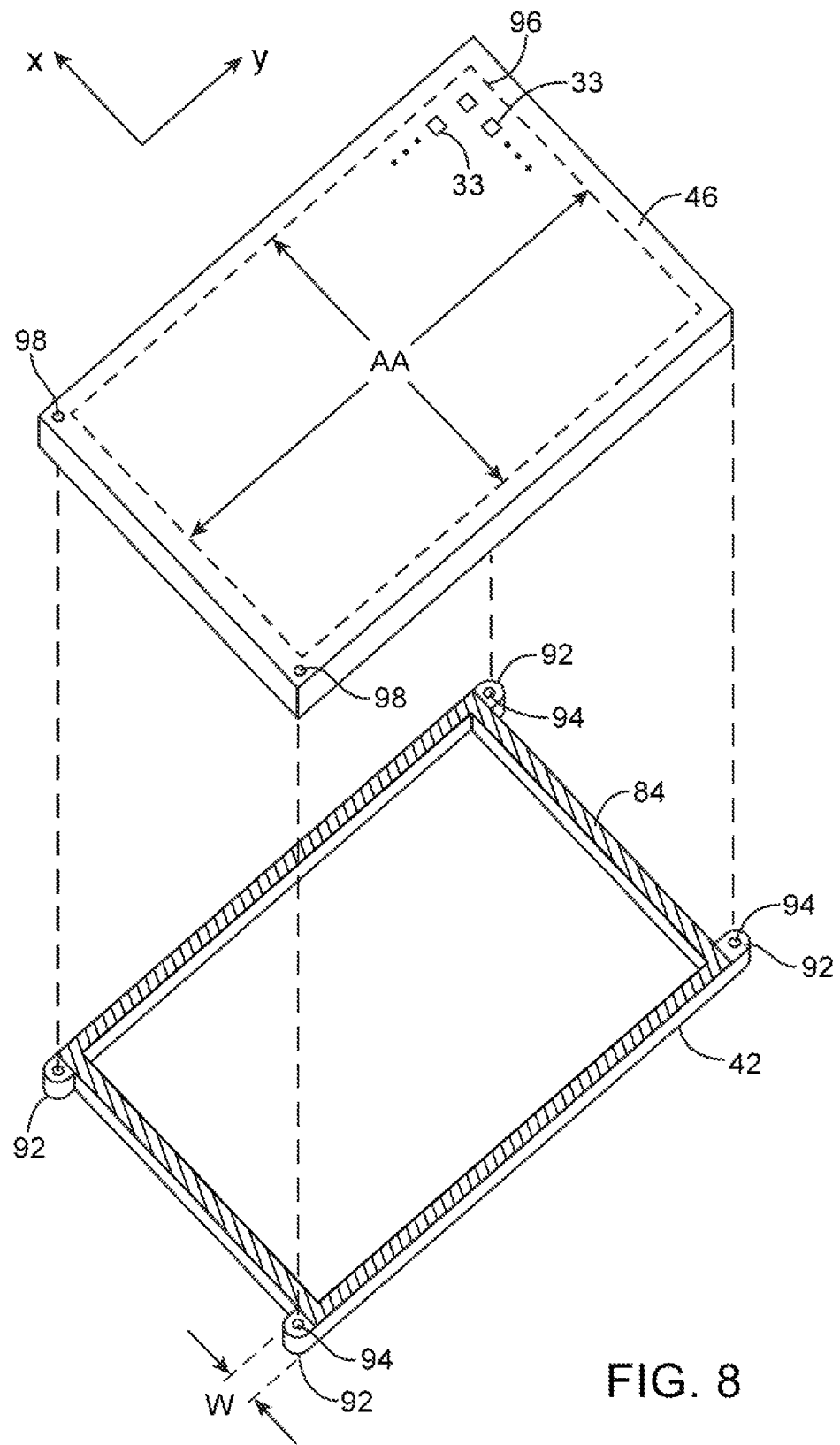
FIG. 8 is a perspective view of an illustrative display unit having an array of display pixels and a backlight unit having openings in accordance with an embodiment.

Backlight structures may be assembled within chassis 90 to form backlight unit 42. In one suitable embodiment, backlight unit 42 and display unit 46 may be assembled separately and may be subsequently attached together using adhesive 84. For example, as shown in FIG. 8, display unit 46 may be aligned with backlight unit 42 by aligning the peripheral edges of display unit 46 with the peripheral edges of backlight unit 46. Once aligned, backlight unit 42 and display unit 46 may be pressed together and adhesive 84 may adhere backlight unit 42 to display unit 46.

As electronic devices are manufactured with increasingly small dimensions, the process of aligning a backlight unit to a display unit may become more difficult. For example, as the border of inactive display area around the active area of a display shrinks, the tolerance for misalignment may also be reduced. Conventional display alignment methods such as aligning the display unit with the backlight unit by hand often yield unsatisfactory results. For example, displays that have been aligned by hand often result in asymmetric inactive borders around the active area of the display. This type of variability is undesirable and can be aesthetically unappealing to a user.

To accommodate the narrow width W at the inactive border of a display, a computer-controlled alignment system may be used to precisely align a display unit such as display unit 46 to a backlight unit such as backlight unit 42. The computer-controlled alignment system may include an optics system for inspecting display unit 42 and backlight unit 42 and for locating alignment features on display unit 42 and/or on backlight unit 42. Alignment features that may be identified may include holes, edges, notches, fiducials, posts, drilled holes, inserts, structures having known shapes, corners, machined structures, laser engraved structures, cutouts, or other structures or surface features that may be recognized by an imaging system.

As shown in FIG. 8, backlight unit 42 may have mounting structures such as mounting structures 92 that protrude laterally from the edges of backlight unit 42. Mounting structures 92 may, for example, be formed from protruding portions of plastic chassis 90P (FIG. 7) that surrounds the light guide plate 78. Each mounting structure 92 may have an opening such as screw hole 94. During assembly of device 10, screws may pass through openings 94 and may screw into threaded portions of housing 12 (as an example), thereby securing display chassis 90 and display units 46 and 42 to housing 12 within device 10.

Openings 94 may, for example, be used as alignment features for aligning display unit 46 and backlight unit 42. For example, a camera in the alignment system may capture images of alignment features such as openings 94 and may determine the locations of openings 94 relative to each other. Based on this information, the alignment system may determine the location of additional datums such as the centroid of backlight unit 42.

The alignment system's camera may also identify and locate alignment features on display unit 46. Any suitable feature that may be recognized by a camera may be used as an alignment feature. For example, an edge such as edge 96 of active area AA of display unit 46 may be recognized by a camera and may be used as an alignment feature. The active area of display unit 46 may include an array of display pixels such as display pixels 33. Display pixels 33 may be formed from light-emitting diodes (LEDs), organic LEDs (OLEDs), plasma cells, electrowetting pixels, electrophoretic pixels, liquid crystal display (LCD) components, or other suitable image pixel structures As another example, one or more fiducials such as fiducials 98 may be formed on the surface of a display layer in display unit 46. Fiducials 98 may be implemented by forming one or more metal alignment marks on the surface of layer 56 (as an example).

Alignment features such as fiducials 98 and/or edge 96 of active area AA may be used by the camera-based alignment system in determining the location of additional datums of display unit 46. For example, the locations of the alignment features may be used to identify the point on active area AA of display unit 46 that should align with the centroid of backlight unit 46.

Once the backlight datums and the corresponding display unit datums have been determined, the alignment system may attach display unit 46 to backlight unit 42 while aligning the backlight datums with the corresponding display unit datums.

Figure 9:
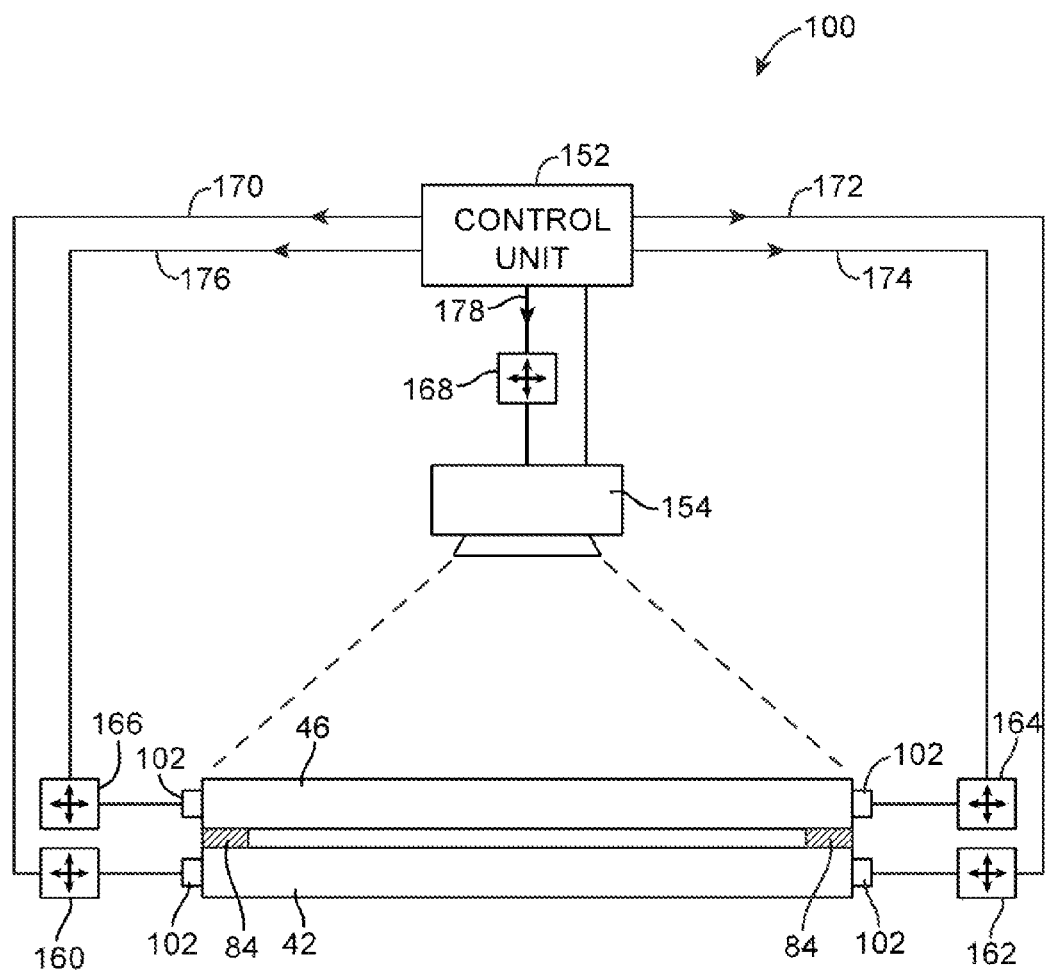
FIG. 9 is a diagram of an illustrative system that may be used to align and attach a display unit to a backlight unit in accordance with an embodiment.

FIG. 9 is a diagram of an illustrative computer-controlled alignment system that may be used to align and attach display unit 46 to backlight unit 42. As shown in FIG. 9, computer-controlled alignment system 100 may include machine vision equipment such as camera 154 for capturing images of display unit 46 and backlight unit 42. Camera 154 may include a digital image sensor that captures digital image data for processing by control unit 152. Camera 154 may have sufficient resolution for capturing images of edges (e.g., edges of substrates, edges such as edge 96 of active display area on display unit 46, etc.), images of openings (e.g., openings 94 in chassis 90 of backlight unit 42), image of fiducials (e.g., fiducials 98 on the surface of a glass substrate in display unit 46), and images of other structures and features.

If desired, a light source may be used to generate polarized and/or unpolarized backlight for illuminating display unit 46 and/or backlight unit 42. The use of a light source to illuminate display unit 46 may help delineate the location of fiducials 98 and/or edge 96 of the active display area in display unit 46.

Data from camera 154 may be analyzed by control unit 152 to determine the locations of alignment features on display unit 46 and backlight unit 42. Control unit 152 may include one or more computers, embedded processors, networked computing equipment, online computing equipment, and/or other computing equipment for processing digital image data from camera 154 or other sensors to determine the location of alignment features on display unit 46 and backlight unit 42 and for issuing corresponding control signals on outputs 170, 172, 174, 176, and 178.

The control signals on outputs 170, 172, 174, 176, and 178 may control the operation of computer-controlled positioners 160, 162, 164, 166, and 168, respectively. For example, control signals on paths 170 and 172 may control the operation of positioners 160 and 162, respectively, which are used in adjusting the position of backlight unit 42. Control signals on paths 174 and 176 may control the operation of positioners 164 and 166, respectively, which are used in adjusting the position of display unit 46. Control signals on path 178 may control positioner 168, which may be used in adjusting the position of camera 154.

Computer-controlled positioners 160, 162, 164, and 166 may adjust the positions of backlight unit 42 and display unit 46 using handling structures such as handling structures 102. Handling structures 102 may be clamps, spatulas, pneumatic structures, finger-like members, or other structures that may be used to handle and manipulate display unit 46 and backlight unit 42. Computer-controlled positioners 160, 162, 164, 166, and 168 may be configured to move and/or rotate backlight unit 42, display unit 46, and camera 154 in any suitable direction.

If desired, different arrangements of positioners may be used. For example, display unit 46 and backlight unit 42 may each be controlled by a single positioner. As another example, display unit 46 or backlight unit 42 may be stationary. The example of FIG. 9 is merely illustrative.

Camera 154 may be used to gather information such as alignment feature location information from display unit 46 and backlight unit 42. The alignment feature location information may be analyzed by control unit 152 to obtain corresponding alignment parameters. The alignment parameters may include, for example, a display unit datum and a backlight datum. Once the alignment parameters have been determined, control unit 152 may issue corresponding control signals to positioners 160, 162, 164, and 166 to maneuver backlight unit 42 and display unit 46 into alignment based on the alignment parameters. This may include, for example, aligning the display unit datum with the backlight datum. Once aligned, control unit 152 may issue control signals to positioners 160, 162, 164, and 166 to move display unit 46 and backlight unit 42 towards each other until adhesive 84 on the surface of backlight unit 42 is in contact with display unit 46 (i.e., until backlight unit 42 and display unit 46 are attached to each other).

Although FIG. 9 illustrates an arrangement in which display unit 46 is interposed between backlight unit 42 and camera 154, it should be understood that the locations of camera 154, display unit 46, and backlight unit 42 may be changed depending on the images that camera 154 is capturing. For example, the locations of camera 154, display unit 46, and backlight unit 42 may be manipulated such that backlight unit 42 is interposed between display unit 46 and camera 154. The arrangement of FIG. 9 is merely illustrative.

If desired, the imaging system that includes camera 154 and control unit 152 may be separate from the computer-controlled positioning equipment that aligns and attaches display unit 46 and backlight unit 42. With this type of configuration, camera 154 may be used to gather alignment feature location information from display unit 46 and backlight unit 42 in a first stage. The alignment feature location information may be analyzed by computing equipment to obtain corresponding alignment parameters. The alignment parameters may be fed to a separate computer-controlled positioning system such as a system that includes a control unit and a plurality of computer-controlled positioners that may be used to maneuver display unit 46 and backlight unit 42. The control unit may instruct the computer-controlled positioners to align and attach display unit 46 and backlight unit 42 based on the previously determined alignment parameters. The example of FIG. 9 in which system 100 includes an optics system for gathering alignment information from display unit 46 and backlight unit 42 and a computer-controlled positioning system for aligning and attaching display unit 46 and backlight unit 42 is merely illustrative.

Figure 10:
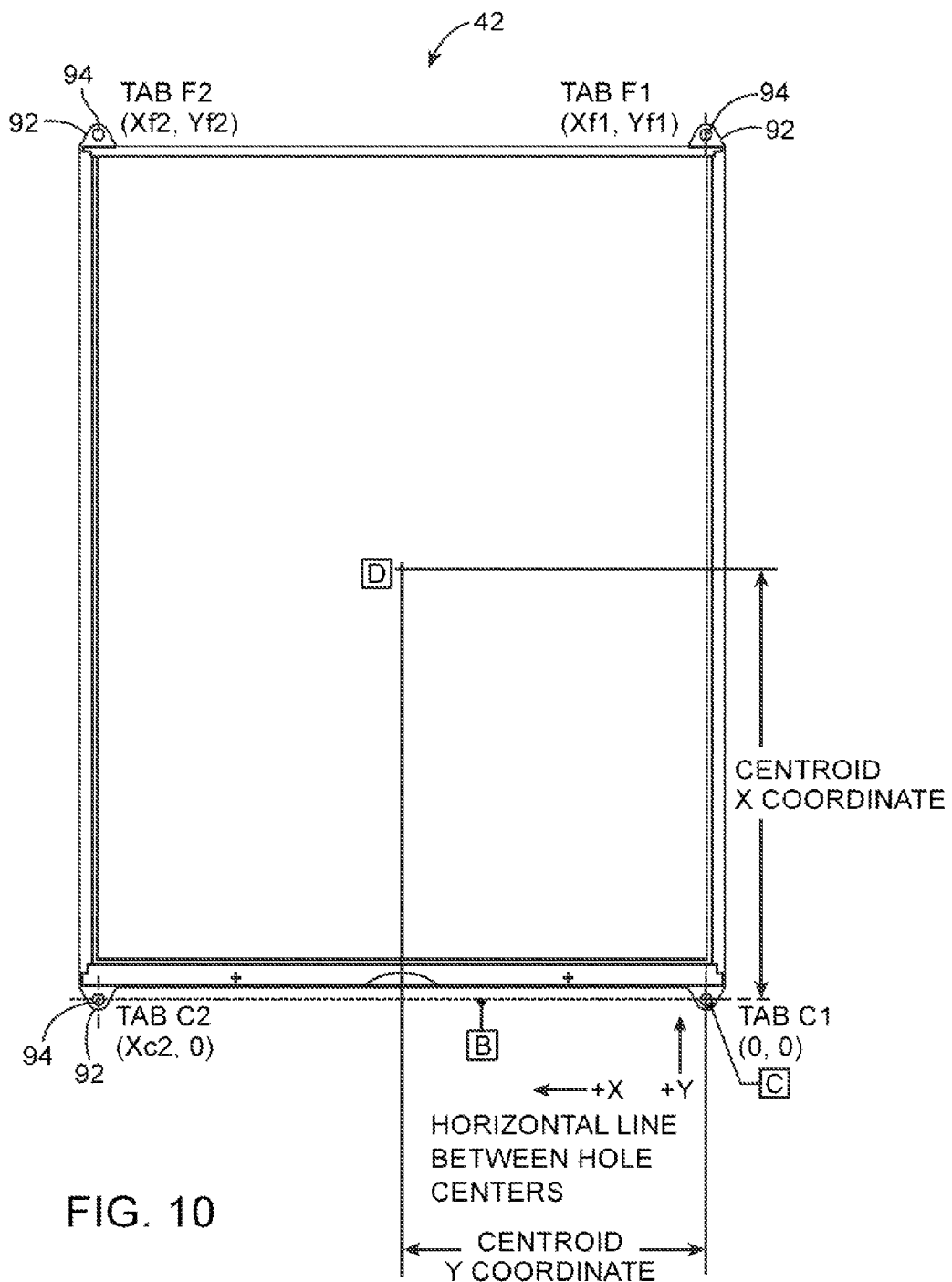
FIG. 10 is a top view of an illustrative backlight unit showing how openings in the backlight unit may be used to determine a centroid of the backlight unit in accordance with an embodiment.

FIG. 10 is a diagram of backlight unit 42 illustrating how the locations of alignment features may be used to determine a backlight datum. As shown in FIG. 10, backlight unit 42 may include mounting structures 92. Each of the four corners of backlight unit 42 may have an associated mounting structure 92. For example, a first corner may have an associated mounting structure 92, labeled "TAB C1," a second corner may have an associated mounting structure 92, labeled "TAB C2," a third corner may have an associated mounting structure 92, labeled "TAB F1," and a fourth corner may have an associated mounting structure 92, labeled "TAB F2."

Each mounting structure 92 may have an associated opening such as opening 94. The locations of openings 94 may be used to determine a backlight datum associated with backlight unit 42. For example, control unit 152 of FIG. 9 may determine the centroid of backlight unit 42 based on the locations of openings 94.

The following illustrative procedure may be performed in order to obtain a backlight datum such as the centroid of backlight unit 42. First, control unit 152 may operate camera 154 to determine the locations of openings 94 relative to each other. For example, the center of opening 94 in TAB C1 may be defined as the origin (indicated as datum "C" in FIG. 10) with (x,y) coordinates of (0,0); the center of opening 94 in TAB C2 may be defined with respect to the origin as having (x,y) coordinates of s(xc2,0); the center of opening 94 in TAB F1 may be defined with respect to the origin as having (x,y) coordinates of (xf1,yf1); and the center of opening 94 in TAB F2 may be defined with respect to the origin as having (x,y) coordinates of (xf2, yf2).

With these predetermined parameters, the x-axis may be defined by a line between opening 94 of TAB C1 and opening 94 of TAB C2. This line may be defined as datum "B," as indicated in FIG. 10. The y-axis may be defined as the line that passes through (0,0) at TAB C1 perpendicular to the x-axis defined by datum B.

Control unit 152 may then determine the centroid of backlight unit 42 based on the (x,y) coordinates of each opening 94. The centroid, indicated as datum "D" in FIG. 10, may have coordinates (xd,yd). The x-coordinate may be the numerical average (arithmetic mean) of the x-coordinates of each of the four openings 94, and the y-coordinate of the centroid may be the numerical average (arithmetic mean) of the y-coordinates of each of the four openings 94. In other words, the coordinates (xd,yd) of centroid D may be calculated using the following equations:

$$xd = \frac{0 + xc2 + xf1 + xf2}{4}$$

$$yd = \frac{0 + 0 + yf1 + yf2}{4}$$

If desired, control unit 152 may use the alignment feature location information to verify that the dimensions of backlight unit 42 are acceptable (e.g., to verify whether the dimensions of backlight unit 42 fall within predetermined ranges of acceptable dimensions). If the dimensions of backlight unit 42 fall outside of the predetermined ranges, one or more structures in backlight unit 42 may be reworked, may be discarded, may be used for other purposes, or may be reanalyzed. If the dimensions of backlight unit 42 fall within the predetermined ranges, backlight unit 42 may proceed to subsequent processing operations.

Figure 11:
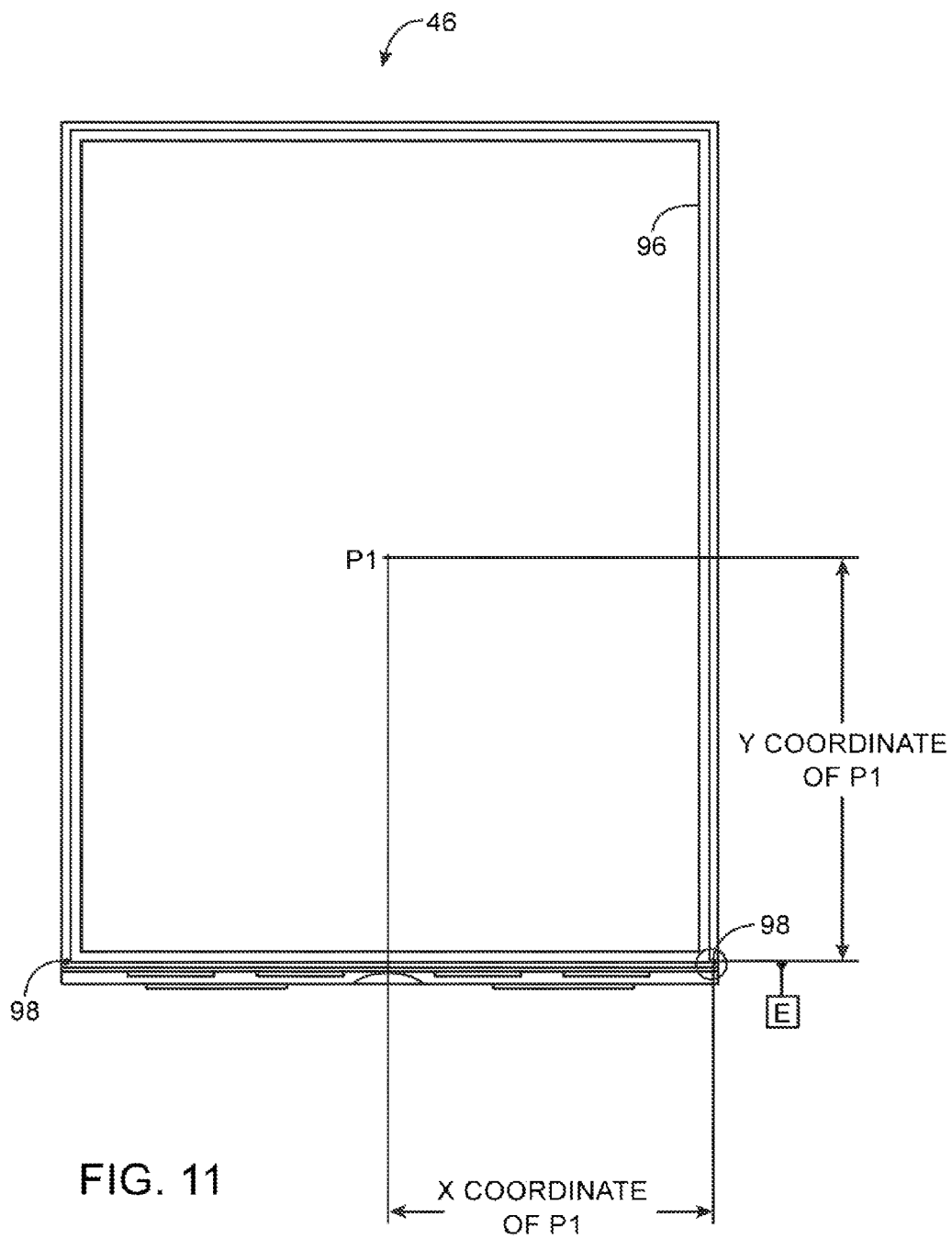
FIG. 11 is a top view of an illustrative display unit showing how alignment features such as fiducials or active area edges on the display unit may be used to determine a backlight unit datum in accordance with an embodiment.

FIG. 11 is a diagram of display unit 46 illustrating how the locations of alignment features may be used to determine a display unit datum. As shown in FIG. 11, display unit 46 may include alignment features such as fiducials 98. If desired, edge 96 of the active portion of display unit 46 may be used as an alignment feature (e.g., in addition to or instead of fiducials 98). The use of fiducials 98 as alignment features is merely illustrative and is sometimes described herein as an example. However, it should be understood that similar alignment operations may be performed using active area border 96 as an alignment feature.

Control unit 152 may operate camera 154 to determine the locations of fiducials 98 relative to each other. As shown in FIG. 11, the line between the two fiducials 98 may be defined as datum "E."

Control unit 152 may then determine the location of datum "P1" based on the locations of fiducials 98. Datum P1 may be a point on the active area of display unit 46 with which the backlight datum D should be aligned. In other words, datum P1 may be a point on display unit 46 that nominally corresponds to the centroid of backlight unit 42. The location of datum P1 may depend on the on the configurations (e.g., the dimensions) of display unit 46 and backlight unit 42. Control unit 152 may determine the location of datum P1 relative to fiducials 98.

Upon determining alignment parameters such as display unit datums P1 and E (FIG. 11) and backlight datums D and B (FIG. 10), control unit 152 may actuate positioners 160, 162, 164, and 166 (FIG. 9) to maneuver backlight unit 42 and display unit 46 into alignment based on the alignment parameters. For example, control unit 152 may issue control signals to the positioners to align display unit 46 and backlight unit 42 such that point P1 on display unit 46 is within a predetermined range of centroid D on backlight unit 42 (e.g., within 35 microns of point D, within 55 microns of point D, within 75 microns of point D, etc.). Control unit 152 may also issue control signals to the positioners to align display unit 46 and backlight unit 42 such that the angle between line E associated with display unit 46 and line B associated with backlight unit 42 is within a predetermined range (e.g., between 0° and ±0.1°, between 0° and ±0.3°, between 0° and ±0.5°, etc.).

When control unit 152 determines that the distance between point P1 of display unit 46 and point D of backlight unit 42 is within the predetermined range of distances and that the angle between line E of display unit 46 and line B of backlight unit 42 is within the predetermined range of angles, control unit 152 may issue control signals to positioners 160, 162, 164, and 166 to move display unit 46 and backlight unit 42 into contact with each other and to thereby attach display unit 46 to backlight unit 42.

The accuracy of automated alignment system 100 may depend on the accuracy of camera 154 in determining the locations of openings 94 in chassis 90. Care must be taken to ensure that the precision involved in determining the locations of openings 94 is maximized.

Mounting structures 92 in which openings 94 are located may be molded (e.g., injection molded) as integral portions of plastic chassis 90P. The accuracy of camera 154 in locating openings 94 may depend on the shape of opening 94 and on the quality of the mold. Conventional injection molding tools often result in molding defects such as flash (sometimes referred to as burrs). This type of molding defect would increase the margin of error involved in determining the location of openings 94 with camera 154. Additionally, conventional molding arrangements typically mold openings having shapes that are not conducive to machine vision imaging.

Figure 12:
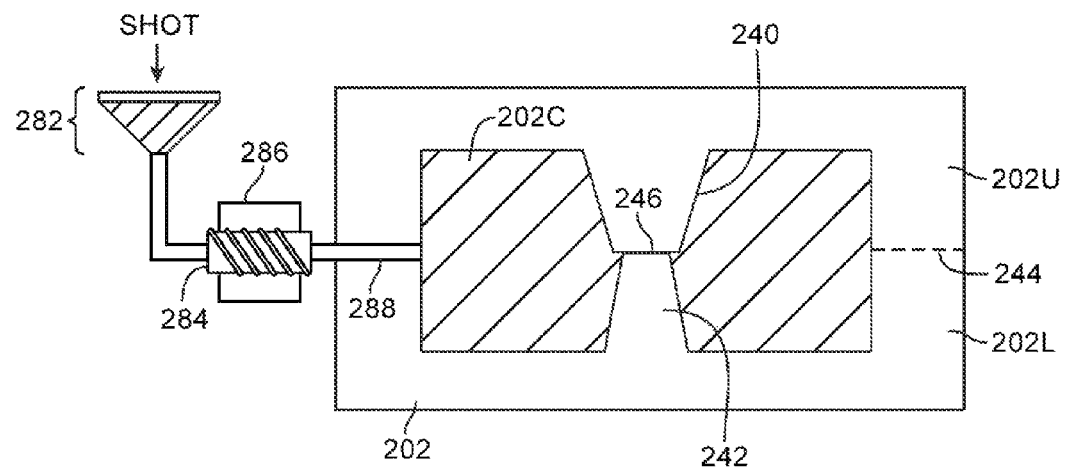
FIG. 12 is a diagram of an illustrative injection molding system that may be used to form a plastic chassis having openings in accordance with an embodiment.

An illustrative injection molding system that may be used to mold a chassis 90P with mounting structures 92 having openings 94 that are suitable for imaging and inspection is shown in FIG. 12. As shown in FIG. 12, injection molding system 200 may include a mold such as mold 202. Mold 202 may include a mold cavity 202C. Mold cavity 202C may have the negative shape of mounting structure 92 such that, when filled with plastic, the resulting part has the shape of mounting structure 92 having opening 94.

As shown in FIG. 12, a shot of pelletized thermoplastic material (e.g., thermoplastic granules or "resin") may be added to a hopper such as hopper 282. The material may be gravity fed into a screw-type plunger such as plunger 284. The heat generated by heating unit 286 and the rotation of the screw in plunger 284 may result in elevated temperatures and a shearing action on the thermoplastic pellets that causes the pellets to melt into molten plastic. Screw rotation in plunger 284 may push the molten plastic towards nozzle 288 and into mold cavity 202C.

When mold 202 has been completely filled, the molten plastic may be cooled. The plastic that solidifies within cavity 202C may form mounting structure 92 having opening 94. When the plastic has solidified, mold 202 may be removed (e.g., mold 202 may be opened by separating upper portion 202U from lower portion 202L along line 244).

To form opening 94 in mounting structure 92, mold 202 may have pins such as pins 240 and 242 that prevent a middle portion of mounting structure 92 from being filled with plastic during the injection molding process.

The use of an upper pin and a lower pin may minimize molding defects such as flash. For example, the clamping force of pin 240 against pin 242 may be sufficient to prevent molten plastic from seeping into interface 246 between upper mold 202U and lower mold 202L.

Figure 13:
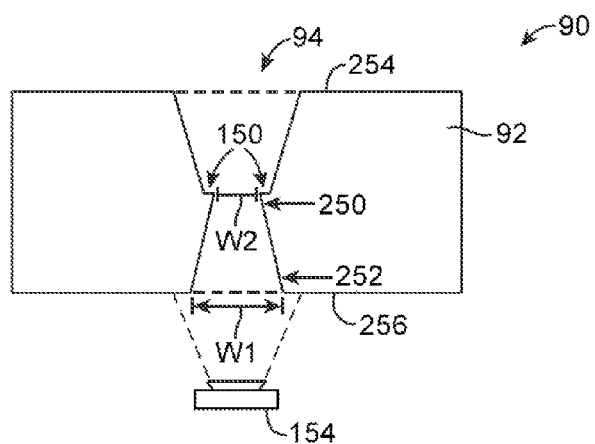
FIG. 13 is a cross-sectional side view of a portion of a plastic chassis having openings in accordance with an embodiment.

Additionally, the use of an upper and a lower pin having different diameters at interface 246 may create an opening having a shape that lends itself to more accurate imaging. For example, as shown in FIG. 13, opening 94 may have an upper opening portion with walls that taper inwardly from upper surface 254 of structure 92 and a lower opening portion with walls that taper inwardly from opposing lower surface 256 of structure 92.

Opening 94 in structure 92 may have ledges such as ledges 150 as a result of the difference in diameters of pins 240 and 242 at interface 246. Due to ledges 150 and the sloped side walls of opening 94, camera 154 may pick up edge 250 or 252 when inspecting opening 94. The difference in location of edge 250 and edge 252 is proportional to the difference between width W1 of opening 94 at edge 252 and width W2 of opening 94 at edge 250.

In conventionally formed openings in molded parts, ledges 250 would not be present and the sloped side walls of opening 94 would extend smoothly from surface 256 to surface 254. The difference in locations of the edges that may be picked up by a camera would then be greater than that of the configuration shown in FIG. 13. The presence of ledges 150 may therefore allow for a more accurate inspection of opening 94 by camera 154.

Figure 14:
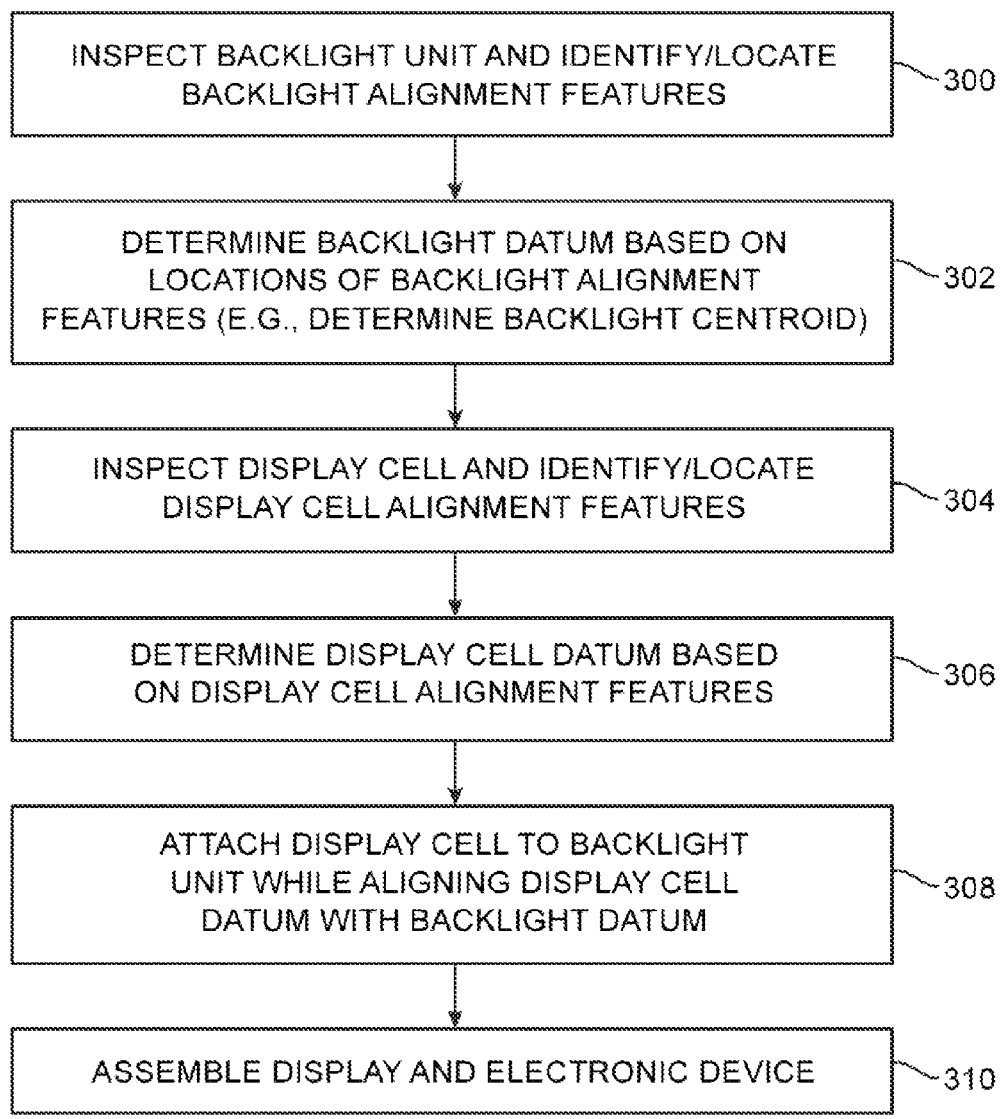
FIG. 14 is a flow chart of illustrative steps involved in assembling display structures using an automated alignment system in accordance with an embodiment.

A flow chart of illustrative steps involved in assembling electronic devices and displays by aligning a display unit with a backlight unit using an automated alignment system is shown in FIG. 14.

At step 300, control unit 152 may gather alignment feature location information from backlight unit 42. This may include operating camera 154 to inspect backlight unit 42 and to identify and determine the location of backlight alignment features. For example, control unit 152 may use camera 154 to determine the locations of openings 94 in chassis 90 relative to each other.

At step 302, control unit 152 may determine one or more backlight datums based on the alignment feature location information. This may include, for example, calculating the centroid of backlight unit 42 based on the locations of openings 94.

At step 304, control unit 152 may gather alignment featured location information from display unit 46. This may include operating camera 154 to inspect display unit 46 and to identify and determine the location of display unit alignment features. For example, control unit 152 may use camera 154 to determine the locations of one or more fiducials 98 on the surface of a display layer such as a color filter substrate or to determine the location of edge 96 of the active display area in display unit 46.

At step 306, control unit 152 may determine one or more display unit datums based on the alignment feature location information. This may include, for example, determining the location of a point on the active display area that nominally corresponds to the centroid of the backlight unit. The location of the display unit datum may be defined relative to the display unit alignment features.

If desired, steps 300 and 304 may both be performed prior to steps 302 and 306 (e.g., alignment feature location information may be gathered from both display unit 46 and backlight unit 42 in a first stage and subsequently analyzed in a second stage to determine backlight and display unit datums).

At step 308, control unit 152 may issue commands to computer-controlled positioners (e.g., positioners 160, 162, 164, and 166 of FIG. 9) to align the backlight datums with the display unit datums. This may include, for example, positioning display unit 46 and backlight unit 42 such that the offset between a display unit datum and a backlight datum is within a predetermined range. When display unit 46 and backlight unit 42 have been satisfactorily aligned, control unit 152 may instruct the computer-controlled positioners to bring display unit 46 and backlight unit 42 into contact with each other (while maintaining alignment) to thereby attach display unit 46 to backlight unit 42.

At step 308, other display structures may be assembled to form display 14 and display 14 may be installed in device housing 12 of electronic device 10 with other device components.

The foregoing is merely illustrative and various modifications can be made by those skilled in the art without departing from the scope and spirit of the described embodiments. The foregoing embodiments may be implemented individually or in any combination.

What is claimed is:

1. A method for attaching a display unit of an electronic device to a backlight unit of the electronic device, wherein the display unit has an array of display pixels, the backlight unit produces backlight for the display unit and has a chassis, and the electronic device has a housing, the method comprising:
   with a control unit, gathering alignment feature location information from alignment features on the display unit and the backlight unit using a camera, wherein the alignment features comprise screw holes on the chassis that receive screws that secure the chassis to the housing;
   with computer-controlled positioners, aligning the display unit with the backlight unit using the alignment feature location information; and
   while the display unit is aligned with respect to the backlight unit, attaching the display unit to the backlight unit using the computer-controlled positioners.

2. The method defined in claim 1 further comprising:
   with the control unit, determining the locations of at least one backlight datum and at least display unit datum based on the alignment feature location information.

3. The method defined in claim 2 wherein aligning the display unit with the backlight unit comprises:
   with the computer-controlled positioners, aligning the display unit with the backlight unit by aligning the at least one backlight datum with the at least one display unit datum.

4. The method defined in claim 3 wherein attaching the display unit to the backlight unit comprises:
   while the at least one backlight datum is aligned with the at least one display unit datum, attaching the display unit to the backlight unit.

5. The method defined in claim 2 wherein determining the location of the at least one backlight datum comprises determining a centroid of the backlight unit.

6. The method defined in claim 5 wherein gathering the alignment feature location information comprises determining respective locations of a plurality of openings in the backlight unit and wherein determining the centroid of the backlight unit comprises computing an average based on the respective locations.

7. The method defined in claim 1 wherein gathering the alignment feature location information comprises:
   determining respective locations of a plurality of openings in the backlight unit.

8. The method defined in claim 7 wherein the plurality of openings are formed in a plastic display chassis in the backlight unit.

9. The method defined in claim 1 wherein gathering the alignment feature location information comprises:
   determining a location of a fiducial on the display unit.

10. The method defined in claim 1 wherein the display unit comprises an active area configured to display images and wherein gathering the alignment feature location information comprises:
    determining a location of an edge of the active area.

11. Apparatus, comprising:
    a display unit;
    a backlight unit, wherein the backlight unit comprises a chassis having a plurality of mounting structures that protrude laterally from the edges of the backlight unit;
    a camera configured to capture images of the display unit and the backlight unit; and a control unit coupled to the camera, the display unit, and the backlight unit, wherein the control unit is configured to align the display unit with the backlight unit based on the captured images using at least one computer-controlled positioner.

12. The apparatus defined in claim 11 further comprising an adhesive on a surface of the backlight unit, wherein the adhesive is configured to attach the display unit to the backlight unit.

13. The apparatus defined in claim 11 wherein the mounting structures of the chassis comprise a plurality of openings and wherein the control unit is configured to determine the respective locations of the plurality of openings in the chassis based on the captured images.

14. The apparatus defined in claim 13 wherein each of the openings in the chassis is formed from an upper opening portion with walls that taper inwardly from an upper surface of the chassis and a lower opening portion with walls that taper inwardly from an opposing lower surface of the chassis.

15. The apparatus defined in claim 13 wherein the chassis comprises an injection molded plastic chassis.

16. The apparatus defined in claim 11 wherein the display unit comprises at least one fiducial and wherein the control unit is configured to determine a location of the at least one fiducial based on the captured images.

17. The apparatus defined in claim 16 wherein the display unit comprises at least one glass substrate and wherein the at least one fiducial is formed on the at least one glass substrate.

18. The apparatus defined in claim 11 wherein the display unit comprises an active area that includes an array of display pixels and wherein the control unit is configured to determine a location of an edge of the active area based on the captured images.

19. The apparatus defined in claim 11 wherein the display unit comprises liquid crystal display pixels and wherein the backlight unit comprises a light source and a light guide plate.

20. A method for attaching a display unit having an array of display pixels to a backlight unit that produces backlight for the display unit, comprising:
- with a control unit, gathering alignment feature location information from the backlight unit using a camera by determining the respective locations of a plurality of openings in the backlight unit;
- with the control unit, determining a centroid of the backlight unit from the alignment feature location information by computing an average based on the respective locations of the plurality of openings in the backlight unit;
- with computer-controlled positioners, aligning the backlight unit to the display unit using the centroid; and
- while the backlight unit is aligned with respect to the display unit, attaching the display unit and the backlight unit using the computer-controlled positioners.

21. The method defined in claim 20 further comprising:
- gathering display unit alignment information from the display unit, wherein aligning the backlight unit to the display unit using the centroid comprises aligning the backlight unit to the display unit using the centroid and the display unit alignment information.

22. The method defined in claim 21 wherein gathering the display unit alignment information comprises gathering active area location information from the display unit using the camera.

23. The method defined in claim 21 wherein gathering the display unit alignment information comprises gathering alignment feature location information from the display unit using the camera.

* * * * *